US007475811B2

(12) United States Patent
Jackman et al.

(10) Patent No.: US 7,475,811 B2
(45) Date of Patent: Jan. 13, 2009

(54) ENHANCED PRE-ALLOCATED CHECK NEGOTIABILITY SYSTEMS AND METHODS

(75) Inventors: Richard Jackman, Collierville, TN (US); Mark Herrington, Memphis, TN (US); Mark Putman, Memphis, TN (US)

(73) Assignee: Money Network, LLC, Memphis, TN (US)

( * ) Notice: Subject to any disclaimer, the term of this patent is extended or adjusted under 35 U.S.C. 154(b) by 220 days.

(21) Appl. No.: 11/223,441

(22) Filed: Sep. 9, 2005

(65) Prior Publication Data

US 2007/0057035 A1    Mar. 15, 2007

(51) Int. Cl.
*G06K 5/00* (2006.01)
(52) U.S. Cl. ........................................ 235/380; 705/45
(58) Field of Classification Search ................. 235/379, 235/380; 707/1; 705/35, 40, 45
See application file for complete search history.

(56) References Cited

U.S. PATENT DOCUMENTS

| 5,393,963 | A | 2/1995 | Thomas et al. |
| 5,457,305 | A | 10/1995 | Akel et al. |
| 5,546,523 | A | 8/1996 | Gatto |
| 5,649,117 | A | 7/1997 | Landry |
| 5,650,604 | A | 7/1997 | Marcous et al. |
| 5,783,808 | A | 7/1998 | Josephson |
| 5,897,625 | A | 4/1999 | Gustin et al. |
| 5,999,624 | A | 12/1999 | Hopkins |
| 6,012,048 | A | 1/2000 | Gustin et al. |
| 6,035,285 | A | 3/2000 | Schlect et al. |
| 6,081,790 | A | 6/2000 | Rosen |
| 6,128,603 | A | 10/2000 | Dent et al. |
| 6,827,260 | B2 | 12/2004 | Stoutenburg et al. |
| 6,829,588 | B1 | 12/2004 | Stoutenburg et al. |
| 2002/0194124 | A1 | 12/2002 | Hobbs et al. |
| 2003/0093368 | A1 | 5/2003 | Manfre et al. |
| 2004/0030607 | A1* | 2/2004 | Gibson ........................ 705/26 |
| 2005/0105704 | A1 | 5/2005 | Harrison et al. |
| 2006/0006224 | A1 | 1/2006 | Modi |

OTHER PUBLICATIONS

"Modular ATM Gives Boost to Diebold", Akron Beacon Journal, Jul. 12, 1997.
"Virginia Bank to Gain Accounts though Pact with Debit Card Issuer", American Banker v164n93p. 7, May 17, 1999.
Western Union—First Data Corp. "Trans$Pay . . . soon to be the Western Union Ppay Card".
Western Union—First Data Corp. "FDX-400 Remote Payroll Distribution".
Office Action dated Jun. 11, 2008, U.S. Appl. No. 11/836,211, filed Aug. 9, 2007, 12 pages.

(Continued)

*Primary Examiner*—Daniel A Hess
(74) *Attorney, Agent, or Firm*—Townsend and Townsend and Crew LLP

(57) ABSTRACT

Systems, methods, and software are described for authorizing transactions undertaken with a negotiable instrument which is pre-allocated a specific amount of funds. A host computer system may receive a request to allocate funds to a negotiable instrument. The host may verify the availability of funds, and allocate the funds to the negotiable instrument. The host may then receive a request to authorize the transaction in which the negotiable instrument is used. The host may verify that the particular instrument has been allocated the specific amount indicated, and thereby authorize the transaction.

27 Claims, 7 Drawing Sheets

OTHER PUBLICATIONS

Written Opinion of the International Searching Authority, dated Jul. 7, 2008, PCT/US06/34867, filed Sep. 7, 2006, 6 pages.

"Modular ATM Gives Boost to Diebold", Akron Beacon Journal, Jul. 12, 1997.

"Virginia Bank to Gain Accounts though Pact with Debit Card Issuer", American Banker v164n93p. 7, May 17, 1999.

Western Union—First Data Corp. "Trans$Pay . . . soon to be the Western Union Ppay Card".

Western Union—First Data Corp. "FDX-400 Remote Payroll Distribution".

Barish, William, "Debit Cards: A Personal Perspective," www.americanpayroll.org, pp. 18-20, Apr. 2002.

"Payroll & Electronic Funds Distribution Solutions: Eliminate the high-cost of paper payroll distribution", 2001, COMDATA®, 1 pg.

Brockman, Todd J., "Card-Based Payroll Solutions," www.americanpayroll.org, pp. 22-23, Apr. 2002.

Green, Elizabeth, CPP, Payroll Cards: How and Why to make Them Work for Your Organization, www.americanpayroll.org, 3 pgs., Apr. 2002.

Barish, William, "Debit Cards: A Personal Perspective," www.americanpayroll.org, pp. 18-20, Apr. 2002.

"Payroll & Electronic Funds Distribution Solutions: Eliminate the high-cost of paper payroll distribution", 2001, COMDATA®, 1 pg.

Brockman, Todd J., "Card -Based Payroll Solutions," www.americanpayroll.org, pp. 22-23, Apr. 2002.

Green, Elizabeth, CPP, Payroll Cards: How and Why to Make Them Work for Your Organization, www.americanpayroll.org, 3 pgs., Apr. 2002.

* cited by examiner

ENHANCED PRE-ALLOCATED CHECK NEGOTIABILITY SYSTEMS AND METHODS

BACKGROUND OF THE INVENTION

Some estimates indicate that fifty-six million (56,000,000) workers in the U.S. do not have a traditional banking relationship. This fact is driving increasing numbers of employers to assist their "unbanked" employees to establish financial partnerships through stored-value cards and other means. Additional benefits for employers may include the reduction of time and expense in distributing and administering paper checks for employees.

Certain financial institutions providing such stored-value accounts may allow customers to access funds with ATM cards. However, some States may require that employees be "paid to the penny" and, thus, ATM only options may impede an employer's ability to mandate such a payroll solution. Some financial institutions allow customers to write checks or create other negotiable instruments to access or otherwise draw funds from their stored-value accounts. This zero-cost approach may allow employers to mandate such payroll solutions.

However, existing check solutions are not widely accepted at merchants using point-of-sale devices to connect to check authorization services. This is due, in part, to the nontraditional nature of the instruments. In addition, existing solutions may require merchants to call a toll-free number and input information onto the check, and many merchants are, thus, resistant. Therefore, there exists a need in the art to enhance the negotiability and ease of use of checks and other financial instruments directly funded from stored value accounts.

BRIEF SUMMARY OF THE INVENTION

According to certain embodiments of the invention, a host computer system may receive a request to allocate a specific amount of funds to a negotiable instrument. The host may verify availability of the specific amount of funds, and may then allocate the funds requested to the negotiable instrument. The funds may be drawn from a stored-value account, a stored-value account funded by payroll funds owed from an employer to an employee, a stored-value card account, a credit card account, a bank account, a savings account, or any combination thereof. The request to allocate a specific amount of funds to a negotiable instrument may be communicated though a telephone voice response unit employing interactive voice response technology, through a web interface, or by other means. In some embodiments, the user enters a transaction number on the instrument when the allocation is approved.

According to various embodiments, the host may later receive a communications signal from a point-of-sale device, wherein the signal comprises a request to authorize a transaction using the negotiable instrument. In various other embodiments, the request to authorize the transaction may originate from other sources, such as a telephone call from a merchant through an operator or IVR. In some embodiments, identification information and an amount are provided with the authorization request. In alternative embodiments, the identification information may comprise a transaction number and issuer number, or, the identification information may comprise a routing number, a check number, and an account number. In certain embodiments, identification information is printed on the negotiable instrument with magnetic ink character recognition ("MICR") technology, and the point-of-sale device may include a MICR reader which automatically reads the identification information from the negotiable instrument. In various embodiments, the identification information and amount may be routed to the host through a check authorization service gateway, and the authorization from the host may be similarly routed through the check authorization service gateway.

The host may authorize the transaction according to various verification procedures. The host may further indicate in a database that the transaction using the negotiable instrument has been authorized, so that any future request to authorize another transaction using the negotiable instrument will be denied. In some embodiments, entry of information on the negotiable instrument by the merchant is not required during the authorization process. In other embodiments, personal identification is not required in the authorization process. A warranty backing the negotiable instrument may be provided with authorization.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following systems, methods, and software may be a component of a larger system, wherein other procedures may take precedence over or otherwise modify their application. Also, a number of steps may be required before, after, or concurrently with the following systems, methods, or software.

I. Overview

Systems, methods, and software are described for authorizing a negotiable instrument to be used in a transaction. According to certain embodiments of the invention, the host computer system may receive a request to allocate a specific amount of funds to the negotiable instrument. The host may verify availability of the specific amount of funds, and may then allocate the specific amount of funds requested to the negotiable instrument.

In some embodiments, the host may later receive a communications signal from a point-of-sale device, wherein the signal comprises a request to authorize a transaction using the negotiable instrument. In various other embodiments, the request to authorize the transaction may originate from other sources, such as a telephone call from a merchant. The host may authorize the transaction according to various verification procedures. The host may further indicate in a database that the transaction using the negotiable instrument was authorized, so that any future request to authorize another transaction using the negotiable instrument will be denied. In some embodiments, no entry of information on the negotiable instrument by the merchant is required during the authorization process.

II. System Architecture

Figure 1A:
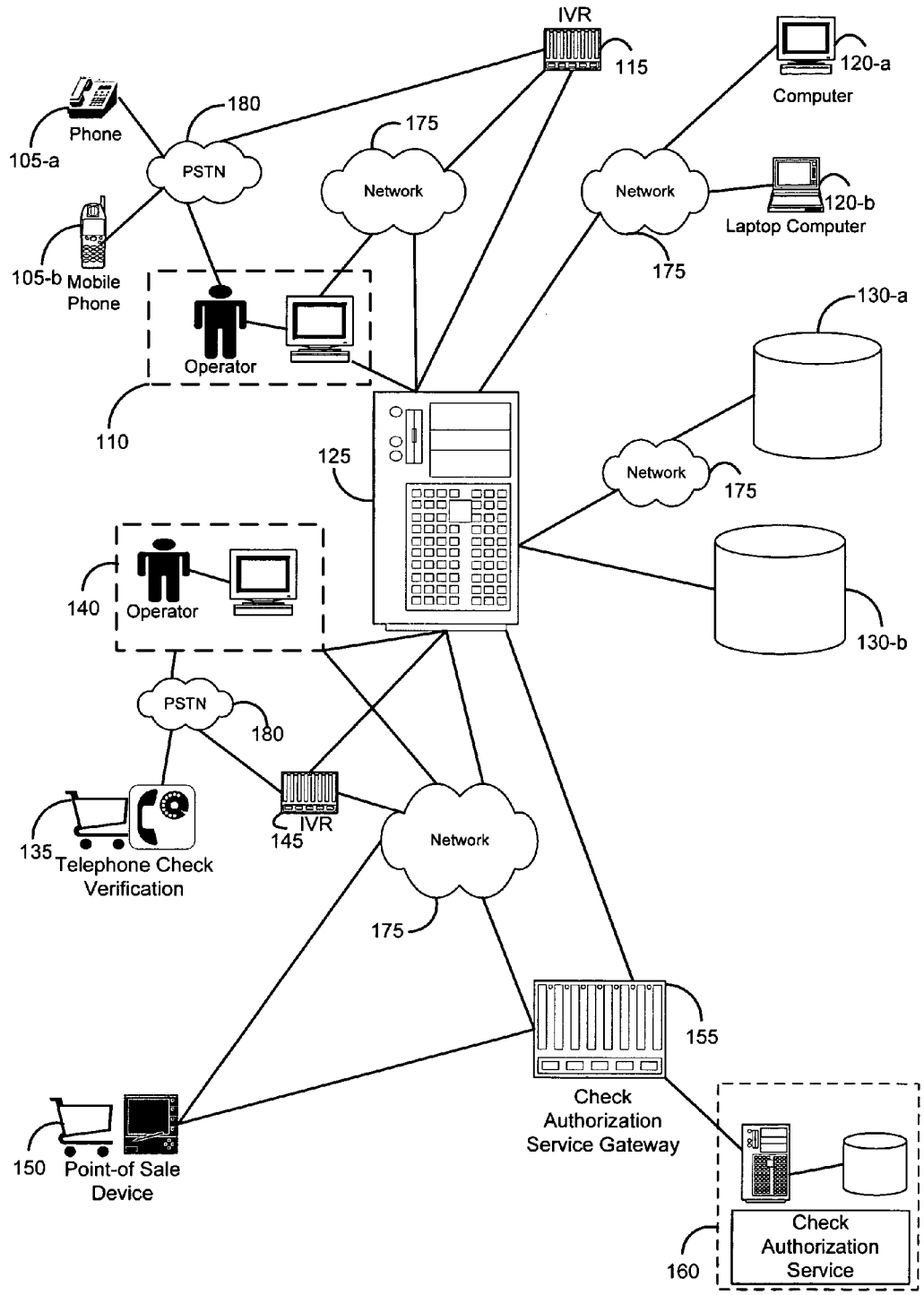
FIG. 1A illustrates a communications system that may be used to authorize a transaction using a negotiable instrument according to various embodiments of the present invention.

FIG. 1 illustrates an example of a Communications System 100 within which various embodiments of the present invention may be included. The System 100 components may be directly connected, or may be connected via a Network 175, which may be any combination of the following: the Internet, an IP network, an intranet, a wide-area network ("WAN"), a local-area network ("LAN"), a virtual private network, the Public Switched Telephone Network ("PSTN"), or any other type of network supporting data communication between devices described herein, in different embodiments. A Network 175 may include both wired and wireless connections, including optical links. Many other examples are possible and apparent to those skilled in the art in light of this disclosure. In the discussion that follows, a Network 175 may or may not be noted specifically. If no specific means of connection is noted, it may be assumed that the link, communication or other connection between devices may be via a Network 175.

1. Allocation of Funds: There are a number of ways for a user to request that available funds be allocated to a particular check, or other negotiable instrument. A negotiable instrument may comprise a check, draft, note or other instrument which directs a financial institution to pay a specific amount of funds from a specific account to the payee. The funds to be allocated may be drawn from an account or group of accounts selected from the following: a stored-value account, a stored-value account funded by payroll funds owed from an employer to an employee, a stored-value card account, a credit card account, a bank account, a savings account, or any other financial account from which funds may be drawn.

In some embodiments, a user may request that funds be allocated to a negotiable instrument by calling a toll-free, or other, number using a phone 105 to connect to a telephone voice response unit ("VRU") employing interactive voice response ("IVR") technology 115. The connection from the phone to the IVR unit may be over the PSTN 180, or otherwise over a Network 175 (e.g., VoIP). A variety of IVR units are commercially available, and such technology is well known in the art.

When a user calls to initiate a request, he or she may be prompted to input or otherwise identify an account number, card number, or other character identifier which identifies the account or accounts from which funds will be withdrawn. The user may also be prompted to input a PIN, password, access code, or other security information. The IVR menu may have a variety of options, such as: access account information, report a lost or stolen card, change an access code, transfer or allocate funds, open a help menu, contact a customer service representative, etc. To allocate funds to the negotiable instrument, a user may select the appropriate prompt. In some embodiments, the user may input the check number, and the specific amount of funds to be allocated to the check. The IVR unit 115 may require a user to provide a response which confirms the specific amount of funds to be allocated. The IVR unit 115 may then provide a transaction number which specifically identifies the particular allocation. The transaction number may comprise any combination of numbers, characters, or other identifying features. In some embodiments, the user may be required to record the transaction number. The negotiable instrument may also include a pre-printed issuer number, which may be used to identify a region, area, location, store, issuer, financial institution, time period, or any other chosen attribute.

Figure 1B:
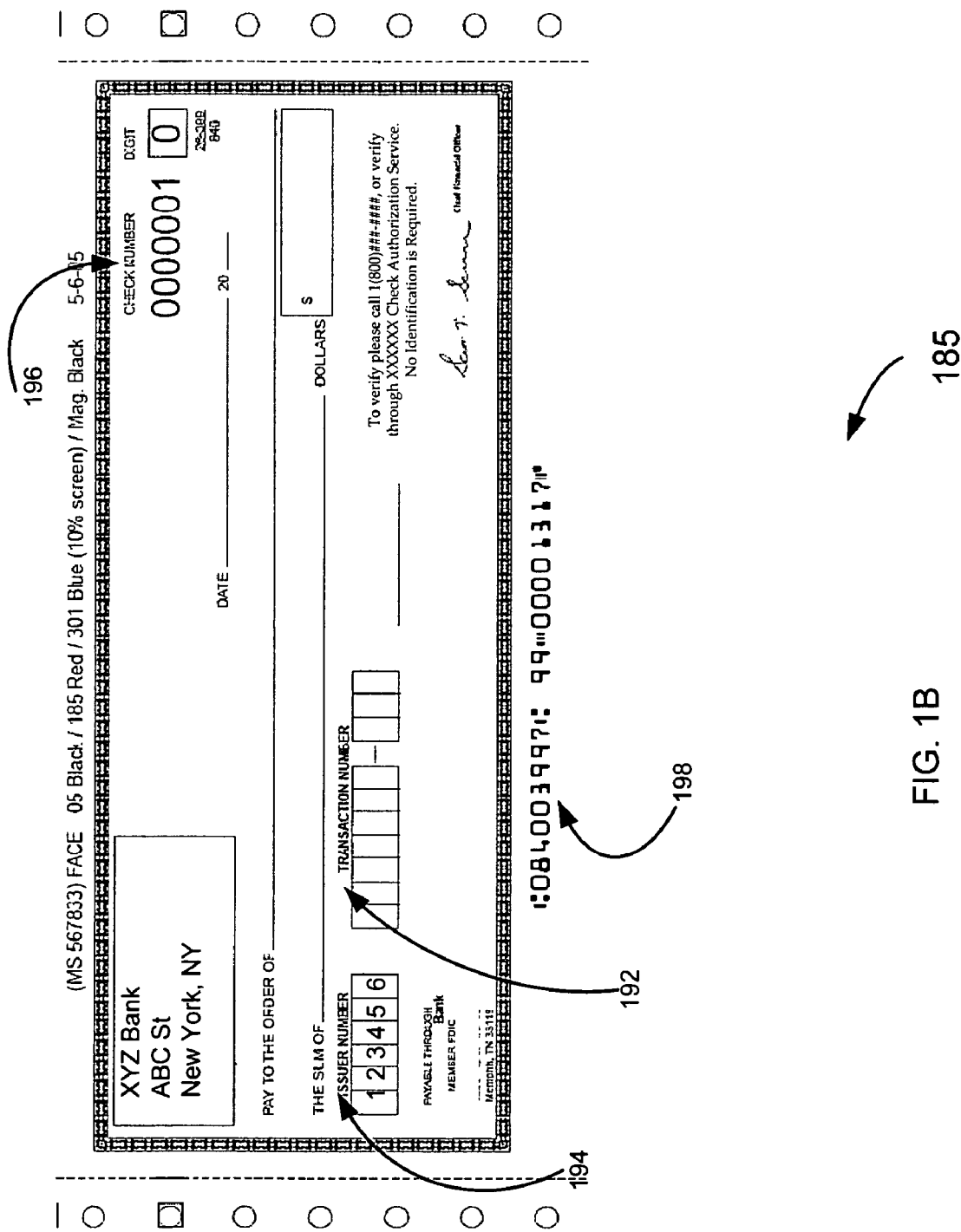
FIG. 1B is a representative image of a negotiable instrument which may be used according to various embodiments of the present invention.

An example of such a negotiable instrument 185 is illustrated in FIG. 1B. The transaction number 192, issuer number 194, and check number 196 are clearly marked, but are shown for exemplary purposes only, and in no way limit the variations available for the alternative embodiments. A negotiable instrument 185 may also include information comprising a routing number, a check number, and an account number which is printed on the negotiable instrument with magnetic ink character recognition ("MICR") 198 technology. In some embodiments, when funds are allocated, they are no longer available for other use. In such embodiments, therefore, the allocation may constitute a transfer of funds to the negotiable instrument. In other embodiments, the allocation may simply render the funds reserved for the instrument. Various other options are available as well. The IVR unit 115 may be in communication with the Host Computer System 125, either directly or via a Network 175.

In other embodiments, a user may request that funds be allocated to a negotiable instrument by calling a toll-free, or other, number using a phone 105 to connect to a live Operator 110, over the PSTN 180 or otherwise over a Network 175 (e.g., via VoIP). The Operator 110 may be in communication, via a connected device, with the Host Computer System 125, either directly or over a Network 175. The Operator 110 may engage in a user interchange similar to the interchange between the user and the IVR 115 described above. The Operator 110 may, thus, solicit information about the appropriate account number, check number, and the specific amount of funds to be allocated to the instrument. The Operator 110 may verify availability of the funds via the Host 125, and then provide a transaction number which specifically identifies the particular allocation. A combination of live Operator 110 and IVR unit 115 input may also be used in funding the instrument.

In still other embodiments, a user may request that funds be allocated to a negotiable instrument by using a personal computer, workstation, laptop computer, mobile device, or other suitable computing device 120 connected to the Internet, or any other such device 120 communicatively coupled to or otherwise in communication with the Host 125 directly or via a Network 175. In some embodiments, the software to enable the communication may be located on the device 120. According to other embodiments, a user may use the web interface of such a device 120 to communicate with the Host 125. A variety of options to provide for such communication are known and apparent to those skilled in the art.

The Host Computer System 125 may, therefore, include application software that enables the Host 125 to perform one or more functions according to the present invention. One application may comprise a user interface application, which may serve as the bridge between the account and the user, allowing a privileged user to modify or access account information, or allocate funds to a negotiable instrument. The user interface may allow a user to input an account number, card number, or other character identifier which identifies the account from which funds will be withdrawn. The user may also be prompted to input a PIN, a password, an access code, biometric information, or other security information to authenticate the user.

In some embodiments, to request allocation of funds to the negotiable instrument, a user may input the check number or other check identifier, and enter the specific amount of funds to be allocated to the check. The Host 125, via the user interface, may then provide a transaction number (as described above) which specifically identifies the particular allocation. The negotiable instrument may also include the preprinted issuer number (as described above). In some embodiments, the user interface may include software which enables a check image to be created that may be printed and serve as the negotiable instrument. In various embodiments, the printed check may be printed on checks or on stock paper. In other embodiments, the negotiable instrument is otherwise provided.

2. Host Computer System: The Host Computer System 125 may receive a request to allocate funds to a negotiable instrument as described above, or may receive the request via other means. The Host 125 may include, for example, one or more server computers, personal computers, workstations, web servers, or other suitable computing devices. The Host 125 may be fully located within a single facility or distributed geographically, in which case a Network 175, as described above, may be used to integrate different components. A Host 125 may comprise any computing device configured to process, manage, complete, analyze, or otherwise address a request to allocate funds to a negotiable instrument, or a request to authorize a transaction using the negotiable instrument, either directly or indirectly.

Application software running on the Host 125 may receive a request to allocate funds to a negotiable instrument, query the Database 130 to verify whether such funds are available for the user from the account, and allocate the specific funds to the negotiable instrument. Such software may also include the functionality to receive a request to authorize a transaction using a negotiable instrument, to authorize the transaction as appropriate, and to indicate that the transaction using the negotiable instrument has been authorized so that any future authorization request will be denied. According to various embodiments of the invention, the Host 125 may receive the request to authorize as described below, or otherwise as apparent to those skilled in the art.

A Host 125 may be in communication with a Database 130, which maintains or otherwise stores account and user information. The Database 130 may comprise one or more different databases, which may be located within a single facility or distributed geographically, in which case a Network 175, as described above, may be used to integrate different components. According to different embodiments of the invention, the Database 130 may include any number of tables and sets of tables. One or more of the databases may be a relational database. The Database 110 may be incorporated within the Host 125 (e.g., within its storage media), or may be a part of a separate system. The Host Computer System 125 may, therefore, comprise the Database 130. The Database 130 may be organized in any manner different than described above to provide the functionality called for by the various embodiments, as known by those skilled in the art.

The Database 130 may contain information related to any of the accounts described above. The Database 130 may include information for a plurality of users, specifying the account holder, account number, balance of funds currently in the account, funds available to be allocated to a negotiable instrument, funds available through a credit line, and security/access information. There may be a number of business rules specific to each account (or institution) relating to procedures for allocation of funds to an instrument. By way of example, there may be different rules related to allocation procedures or levels of security for different accounts. Such rules may be institutionally mandated, or directed by user profile and preferences. Such rules may be set forth in the application software running on the Host 125, or included in the Database.

The Database 130 may also maintain, or otherwise store, information relating to the allocation of funds to a negotiable instrument. In some embodiments, the Database stores identification information related to a specific negotiable instrument, and the specific amount of funds allocated to the instrument. This identification information may comprise the transaction number and issuer number described above. In some embodiments, the identification information may comprise the routing number, a check number, and an account number. The identification information may be printed on the negotiable instrument with magnetic ink character recognition ("MICR") technology. Technology evolves, and there are a number of current and future alternatives and combinations available to provide such identification information for a negotiable instrument.

Application software running on the Host 125 may query the Database 130 to determine whether a specific amount of funds have been allocated to a particular negotiable instrument in response to a request for authorization. The Host 125 may authorize the transaction if the Database 130 indicates that the specific amount of funds have been so allocated. In some embodiments, no personal identification is required. In other embodiments, additional instrument or user verification procedures may be employed.

3. Instrument Authorization: Once funds have been allocated to a negotiable instrument, there are a number of options to provide authorization for a transaction using the negotiable instrument. According to certain embodiments of the invention, a point-of-sale device 150 may be used to authorize a transaction. A point-of-sale device 150 may comprise an electronic point-of-sale or debit terminal, device or system that has been programmed to process transactions. Such a device may comprise a terminal, device or system that has been programmed and certified to the specifications of networks (e.g., ATM/debit, point-of-sale or check processor networks) in order to be able to process merchant or online transactions using paycards or other stored-value cards. In various embodiments, no form of personal identification is required from a user of the negotiable instrument at the point-of-sale device 150 for authorization of the transaction.

A merchant may request, from the point of-sale-device 150, authorization for a transaction using the negotiable instrument. A merchant may scan a check electronically from a point-of-sale device 150 using the MICR data printed on the check, or scan other identification information printed on, or otherwise located on or in, the check. A variety of point-of-sale device scanners are available commercially, and well known in the art. Alternatively, a merchant may manually enter the identification information and specific amount into the point-of-sale device. In still other embodiments, certain information may be scanned, and other information entered.

In some embodiments, the point-of-sale device 150 may be in communication with the Host 125 over a Network 175. The point-of-sale device 150 may transmit a set of data comprising the instrument identification information and the specific amount of the transaction to the Host 125. The set of data may be transmitted in a communications signal. A communications signal, as that term is used throughout the Application, may comprise any number of signals (i.e., the information may be sent in any number of different signals or packets). In other embodiments, the point-of-sale device 150 may be in communication with a Check Authorization Service Provider 160, such as Telecheck™ or Certegy™. The point-of-sale device 150 may communicate with a Check Authorization Service 160 through the Check Authorization Service Gateway 155. In certain embodiments, the Gateway 155 may receive the request for authorization, and forward the information to the Host 125 over a Network 175. In some embodiments, the Gateway 155 recognizes the routing number included in a request, and routes the set of data comprising the amount and the identification information to the Host 125, thus bypassing the Check Authorization Service 160. By way of example, in recognizing the routing number, the Gateway 155 may bypass any service application business rules from the Provider 160, and send the specific set of data directly to the Host 125. In some embodiments, the Host 125 may also comprise a Check Authorization Service Provider 160.

A merchant may request authorization for a transaction using the negotiable instrument by calling a toll-free, or other, number using a phone 135 to connect to a live Operator 140. This connection may be over the PSTN 180, or otherwise over a Network 175 (e.g., VoIP). The Operator 110 may be in communication, via a connected device, with the Host Computer System 125, either directly or over a Network 175. The Operator 140 may request, or otherwise receive, information from the merchant comprising the amount of the funds specified on the instrument, and the identification information for the instrument. In some embodiments, the instrument identification information may comprise the transaction number and the issuer number, as those terms are described above. In certain embodiments, the identification information may comprise the routing number, check number, and account number. A number of alternative identification mechanisms are known in the art, and it is recognized that they may evolve as technology advances.

In other embodiments, the merchant may request authorization for a transaction using the negotiable instrument by calling a toll-free, or other, number using a phone 135 to connect to an IVR 145. The IVR 145 may be connected to the Host 125 directly, or indirectly over a Network 175. The IVR 145 may be programmed to engage in an interchange similar to the interchange between the merchant and the Operator 140 described above. The IVR may, thus, provide prompts which request information comprising the specific amount of the funds allocated and the instrument identification information. A combination of live Operator 140 and IVR unit 145 input may also be used in receiving the authorization request. In various embodiments, no form of personal identification is required from a user of the negotiable instrument for authorization of the transaction.

Upon receiving a request to authorize a negotiable instrument, whether in a manner as described above or otherwise, the Host Computer System 125 may authorize a transaction. In various embodiments, other responses such as "denied," "request identification," or "contact financial institution," may be specified as well. According to various embodiments, the Host may query the Database 130 to determine if the negotiable instrument (as identified by the identification information provided) has been allocated the specific amount of funds indicated. Said differently, the Host 125 may determine if the amount stated on the negotiable instrument (e.g., from the point-of-sale device or merchant) matches an allocation to a negotiable instrument with the same identification information stored in the Database 130. According to various embodiments, other verification procedures may be used as well.

If a transaction is authorized, the Host 125 may transmit a communication signal to indicate authorization. If the merchant has used a phone to request authorization, the response may be returned over the phone (e.g., through an IVR 145 or the Operator 140) or other electronic means (e.g., e-mail, electronic messaging, point-of-sale device 150, etc.). If the point-of-sale device 150 transmits the request, the communications signal which is transmitted from the Host 125 may be directed to the point-of-sale device 150 via the Network 175. Alternatively, the authorization (or denial, system down, etc.) response may be directed through the Check Authorization Service Gateway 155, where it may be mapped onto an existing response of the Check Authorization Service Provider 160.

An instrument may fail to be authorized for a variety of reasons: a timeout, identification information that is invalid or an improper length, an improper dollar amount, an improper merchant number, or any number of other reasons. According to certain embodiments, if the transaction is authorized, the Host 125 may indicate that the transaction has been authorized, the instrument may be marked as "cashed" in the Database 130, and no other transaction with the instrument may be allowed. In some embodiments, a warranty may be provided with the authorization, from either the Check Authorization Service Provider 160, a financial institution, or other entity. The availability and transfer of allocated or authorized finds may vary. Funds allocated from an account may be rendered immediately unavailable by the Host 125, or may be unavailable only when authorization occurs. Funds allocated from an account may be immediately transferred from the account, or, for example, transferred only when the check is processed from the merchant. A number of other options are apparent to those skilled in the art. A better understanding of the embodiments of the system may be gained with further discussion of various methods of authorization, and the systems and software that support them.

III. Point-of-Sale Embodiments

Figure 2:
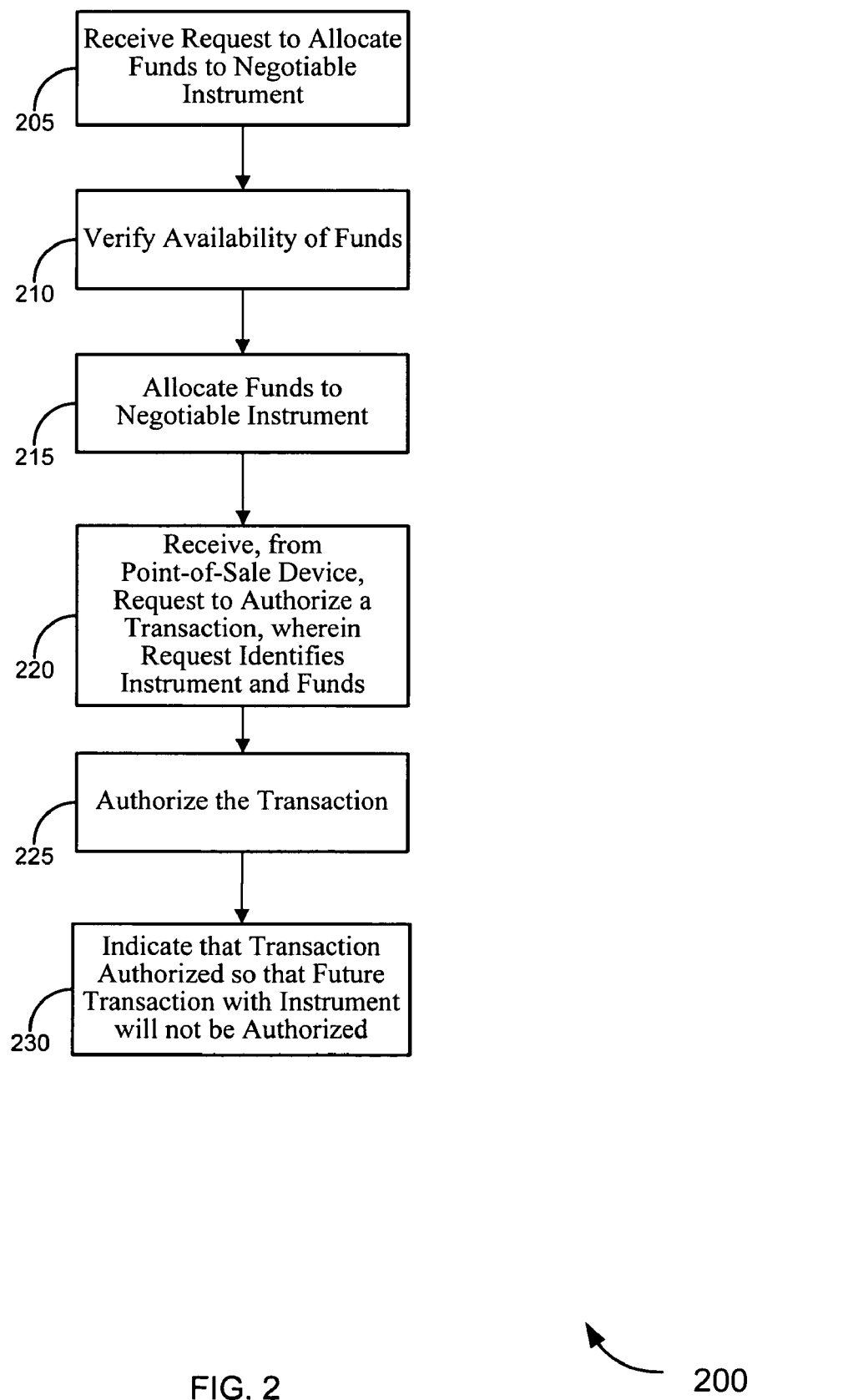
FIG. 2 is a flow diagram that illustrates a method that may be used, in conjunction with a point-of-sale device, to authorize a transaction using a negotiable instrument according to various embodiments of the present invention.

FIG. 2 sets forth an exemplary embodiment 200 of the invention, illustrating an example of a method wherein a request to authorize a transaction with a negotiable instrument is received from a point-of sale device 150. At block 205, a Host Computer System 125 receives a request to allocate a specific amount of funds to the negotiable instrument. The Host may verify the availability of the specific amount of funds at block 210, and allocate available funds to the negotiable instrument at block 215.

At block 220, the Host 125 may receive a communications signal originating at a point-of-sale device, wherein the signal comprises a request to authorize a transaction with the negotiable instrument. The request includes information comprising the dollar amount specified on the instrument, and identification information which identifies the negotiable instrument. In alternative embodiments, the identification information may comprise the transaction number and issuer number described above, or the identification information may comprise a routing number, a check number, and an account number. At block 225, the Host 125 may authorize the transaction. At block 230, the Host may indicate that the transaction was authorized, so that any future request to authorize a transaction with the instrument will not be authorized.

Figure 3:
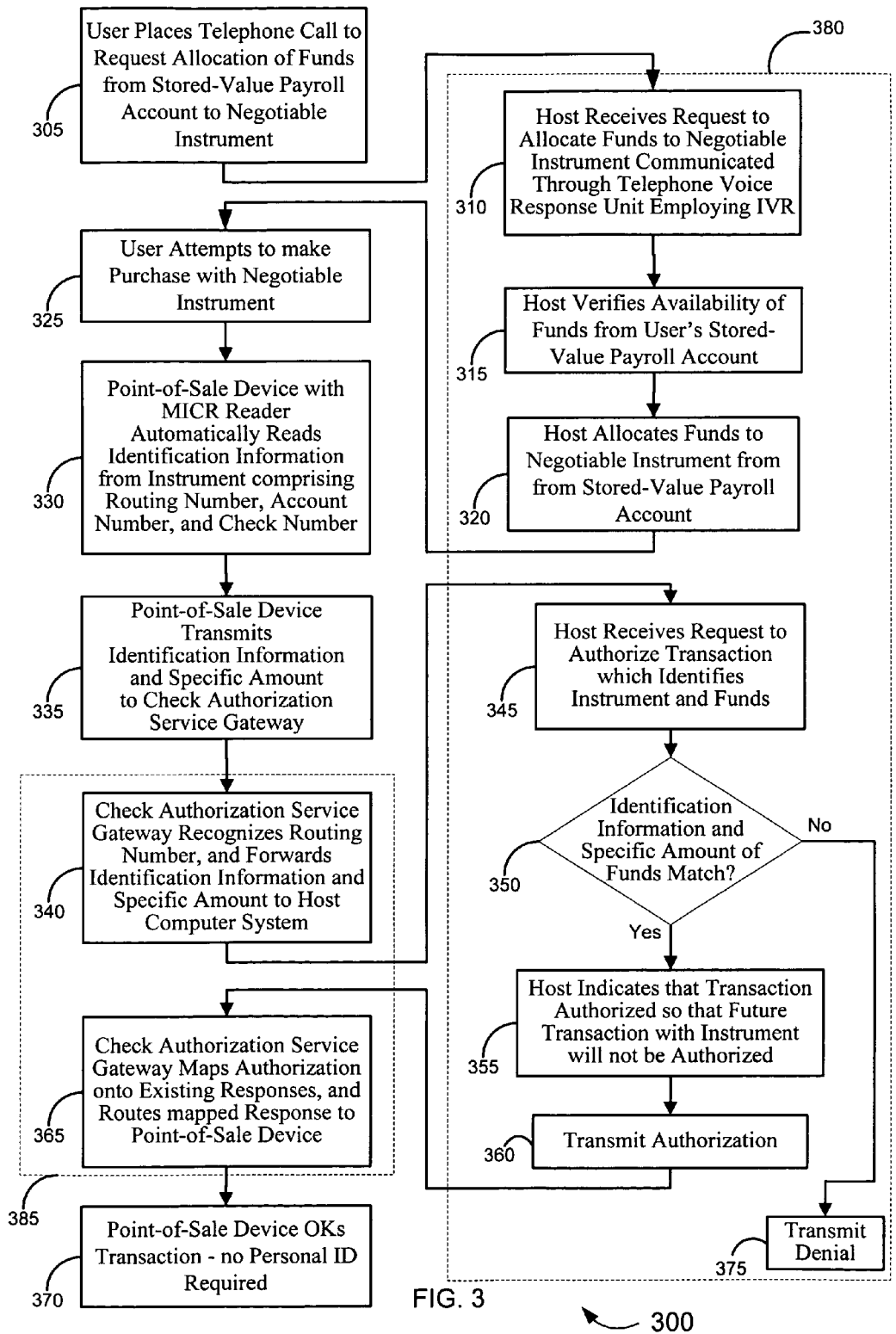
FIG. 3 is a flow diagram that illustrates a system which, in conjunction with a point-of-sale device, may authorize a transaction using a negotiable instrument according to various embodiments of the present invention.

FIG. 3 sets forth an alternative exemplary embodiment of the invention, illustrating an example 300 wherein a request to authorize a transaction with a negotiable instrument is received from a point-of sale device 150. At block 305, a user may place a phone call to request the allocation of funds from a stored-value payroll account to a negotiable instrument. At block 310, the Host 125 may receive the request, communicated through a telephone voice response unit using IVR. The Host 125 may verify availability of the funds from the user's stored value account at block 315. The Host 125 may access the Database 130 to determine availability of the funds, or may otherwise query the account or maintaining financial institution. At block 320, the Host 125 may allocate the requested funds to the negotiable instrument from the stored-value payroll account as described above. Such an allocation may be recorded in the Database 130, or elsewhere.

With the allocation successful, the user may attempt to make a purchase with the negotiable instrument at block 325. A point-of-sale device 150 with a MICR reader may automatically read the identification information from the instrument at block 330. The identification information comprises a routing number, an account number, and a check number. At block 335, the point-of-sale device 150 may transmit the request information comprising the specific amount on the instrument and the identification information. At block 340, the Check Authorization Service Gateway 155 may recognize the routing number, and forward the information comprising identification and amount to the Host 125 without first applying any other business or authorization rules.

At block 345, the Host 125 may receive the request to authorize funds forwarded from the Gateway 155. At block 350, the Host 125 may determine if the amount stated on the negotiable instrument matches an allocation to a negotiable instrument with the same identification information stored in the Database 130, or elsewhere. If not, the transaction may be denied at block 375. If matched, the Host 125 may authorize the transaction at block 355, and may record such an authorization in the Database 130, or elsewhere, so that any future request for authorization with the instrument will be denied.

At block 360, the Host may transmit a communication signal authorizing the transaction. At block 365, the Check Authorization Service Gateway 155 may map the authorization response onto an existing authorization response of the service, and route the mapped response to the point-of-sale device 150. The point-of-sale device 150 may receive the authorization at block 370, comprising the standard authorization response from the service. The authorization may be granted without personal identification at the point-of-sale device 150. In some embodiments, the point-of-sale device 150 may, optionally, include a printer configured to print any combination of the foregoing on the instrument: merchant name, merchant bank name, merchant bank account number, for deposit only, amount, merchant id number, check number, date and time, or 4 digit authorization code.

The dashed area designated by reference numeral 380 may comprise the actions generally undertaken by the Host 125. The dashed area designated by reference numeral 385 may comprise the actions generally undertaken by the Gateway 155. It should be noted that the methods, systems and devices discussed above are intended merely to be exemplary in nature, and that various embodiments may omit, substitute, or add various procedures or elements as appropriate.

IV. Alternative Authorization Embodiments

Figure 4:
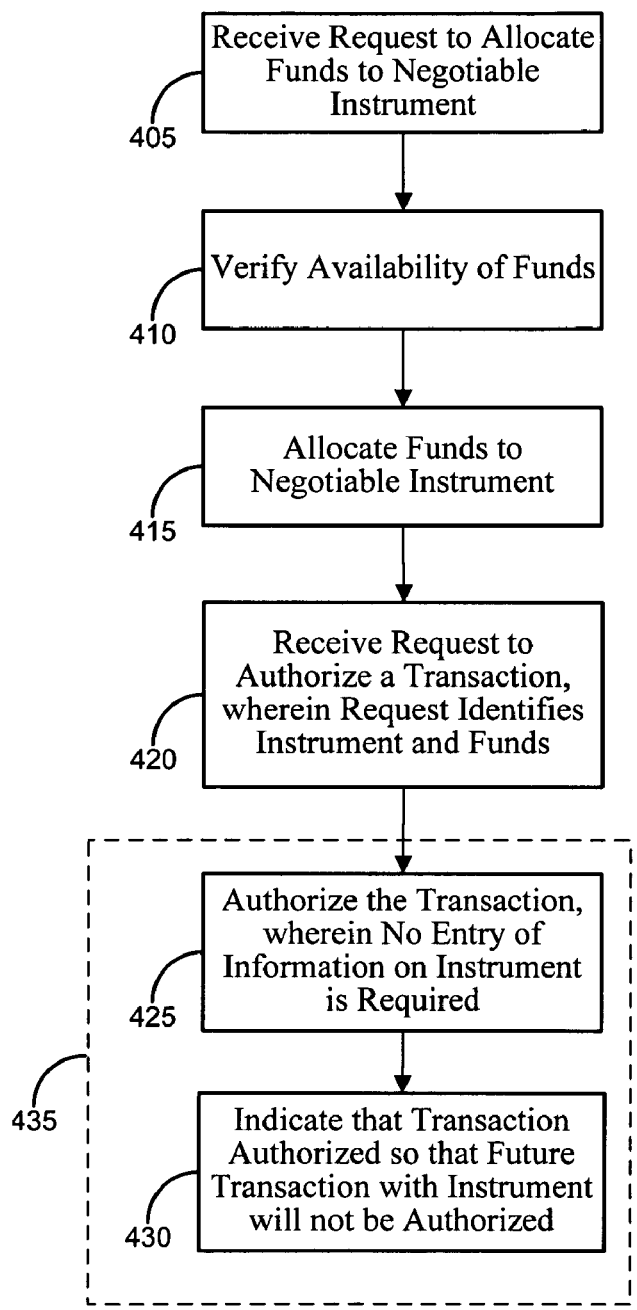
FIG. 4 is a flow diagram that illustrates a method that may be used to authorize a transaction using a negotiable instrument according to various embodiments of the present invention.

FIG. 4 sets forth another exemplary embodiment 400 of the invention, illustrating an alternative example of a method wherein a Host 125 receives a request to authorize a transaction with a negotiable instrument. At block 405, a Host Computer System 125 may again receive a request to allocate a specific amount of funds to the negotiable instrument. The Host may verify the availability of the specific amount of funds at block 410, and allocate available funds to the negotiable instrument at block 415. In some embodiments, the allocation renders the funds unavailable for use elsewhere, and actually "funds" the negotiable instrument.

At block 420, the Host 125 may receive a request to authorize a transaction with the negotiable instrument. The request may be received from an IVR 145, from an Operator directed computing device 140, or from any other source. The request may include information comprising the dollar amount specified on the instrument, and identification information which identifies the negotiable instrument. In these embodiments, the identification information may comprise the transaction number and issuer number as described above. In alternative embodiments, the identification information may comprise a routing number, a check number, and an account number, or may comprise any other unique identifier known in the art. At block 425, the Host 125 may authorize the transaction, and may provide that no additional information need be entered by the merchant or holder to complete the transaction. At block 430, the Host may indicate that the transaction was authorized, so that any future request to authorize a transaction with the instrument will not be authorized. The dashed area designated by reference numeral 435 may indicate elements which are not required according to various embodiments of the invention.

Figure 5:
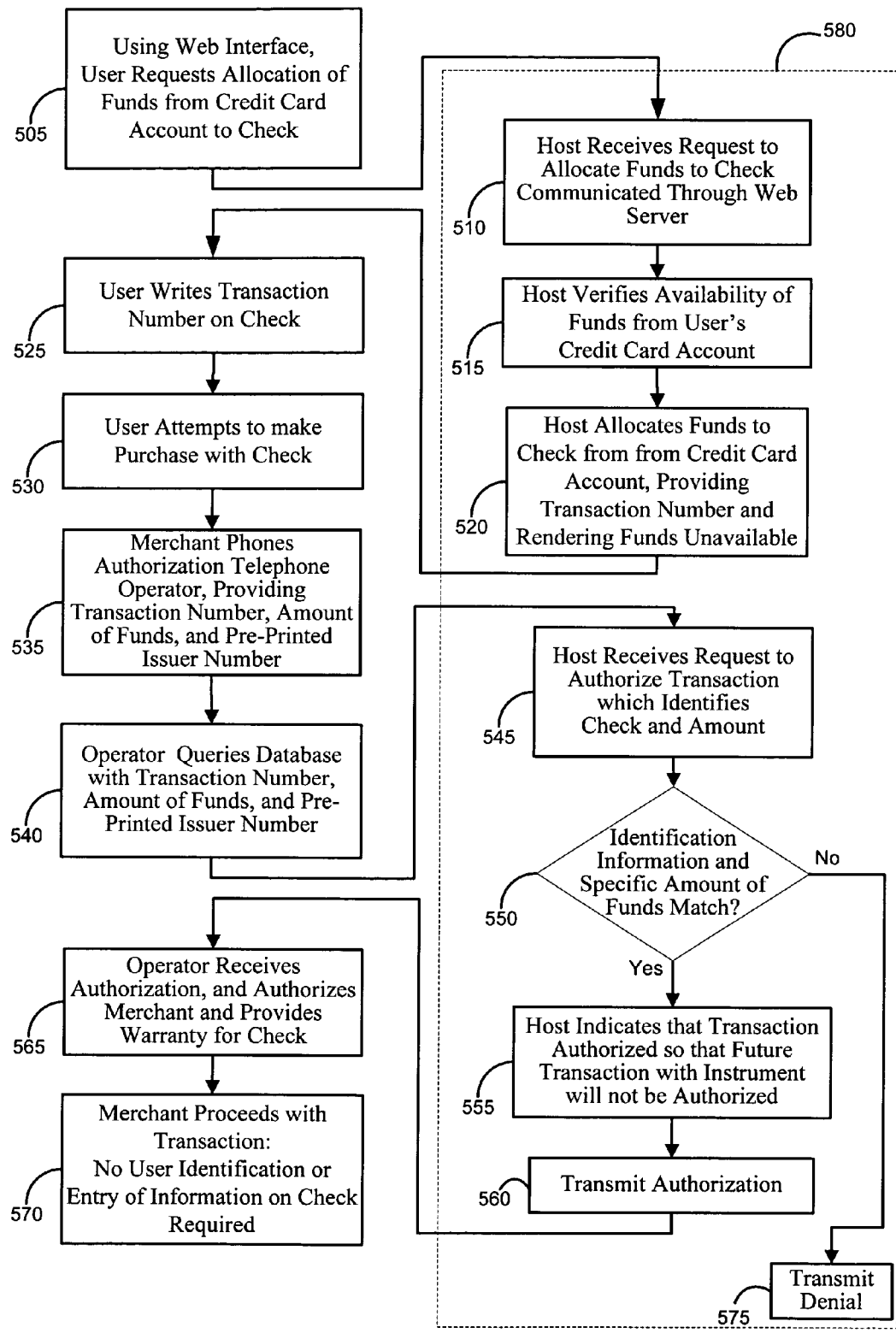
FIG. 5 is a flow diagram that illustrates a system which may be used to authorize a transaction using a negotiable instrument according to various embodiments of the present invention.

FIG. 5 sets forth yet another exemplary embodiment of the invention, illustrating an example 500 wherein a Host 125 receives a request to authorize a transaction with a negotiable instrument. At block 505, a user may communicate with the Host 125 via a web interface to request the allocation of funds from a credit card account to a check. At block 510, the Host 125 may receive the request, communicated through a web server associated with or integrated into the Host 125. The Host 125 may verify availability of the funds from the user's credit card account at block 515. The Host 125 may access the Database 130 to determine availability of the funds, or may otherwise query the account or maintaining financial institution. At block 520, the Host 125 may direct the allocation of the requested funds to the negotiable instrument from the credit card account, as described above. In some embodiments, the allocation renders the funds unavailable for credit line use elsewhere, and actually "funds" the check. Such an allocation may be recorded in the Database 130, or elsewhere.

With the allocation successful, the Host 125 may transmit a transaction number for the user to write down on the check at block 525, along with the amount. In some embodiments, the check with the transaction number, issuer number, check number, and specific amount may be printed, in whole or in part, from a printer communicatively coupled with the web interface device. The user may attempt to make a purchase with the check at a merchant, at block 530. The merchant may, at block 535, place a phone call to a telephone Operator 140 and provide the transaction number, issuer number, and amount. At block 540, the Operator 140 queries the database directly, or indirectly though a graphical interface, providing the transaction number, issuer number, and amount. In alternative embodiments, other forms and combinations of check identification information may be used.

At block 545, the Host 125 may receive the request to authorize the transaction, wherein the request identifies the specific check and amount as described above. At block 550, the Host 125 may determine if the amount stated on the check matches an allocation to a check with the same identification information stored in the Database 130, or elsewhere. If not, the transaction may be denied at block 575. If matched, the Host 125 may authorize the transaction at block 555, and may record such an authorization in the Database 130, or elsewhere, so that any future request for authorization with the check will be denied.

At block 560, the Host may transmit a communication signal authorizing the transaction. At block 565, the Operator 140 may receive the authorization through his or her connected device, and provide verbal authorization and a warranty for the instrument. The merchant may, at block 570, then proceed with the transaction without the requirement or necessity for the user to provide identification and without a requirement that any information be input onto the check. The dashed area designated by reference numeral 580 may comprise the actions generally undertaken by the Host 125. It should again be noted that the methods, systems and devices discussed above are intended merely to be exemplary in nature, and that various embodiments may omit, substitute, or add various procedures or elements as appropriate.

V. Computing Device Structure

Figure 6:
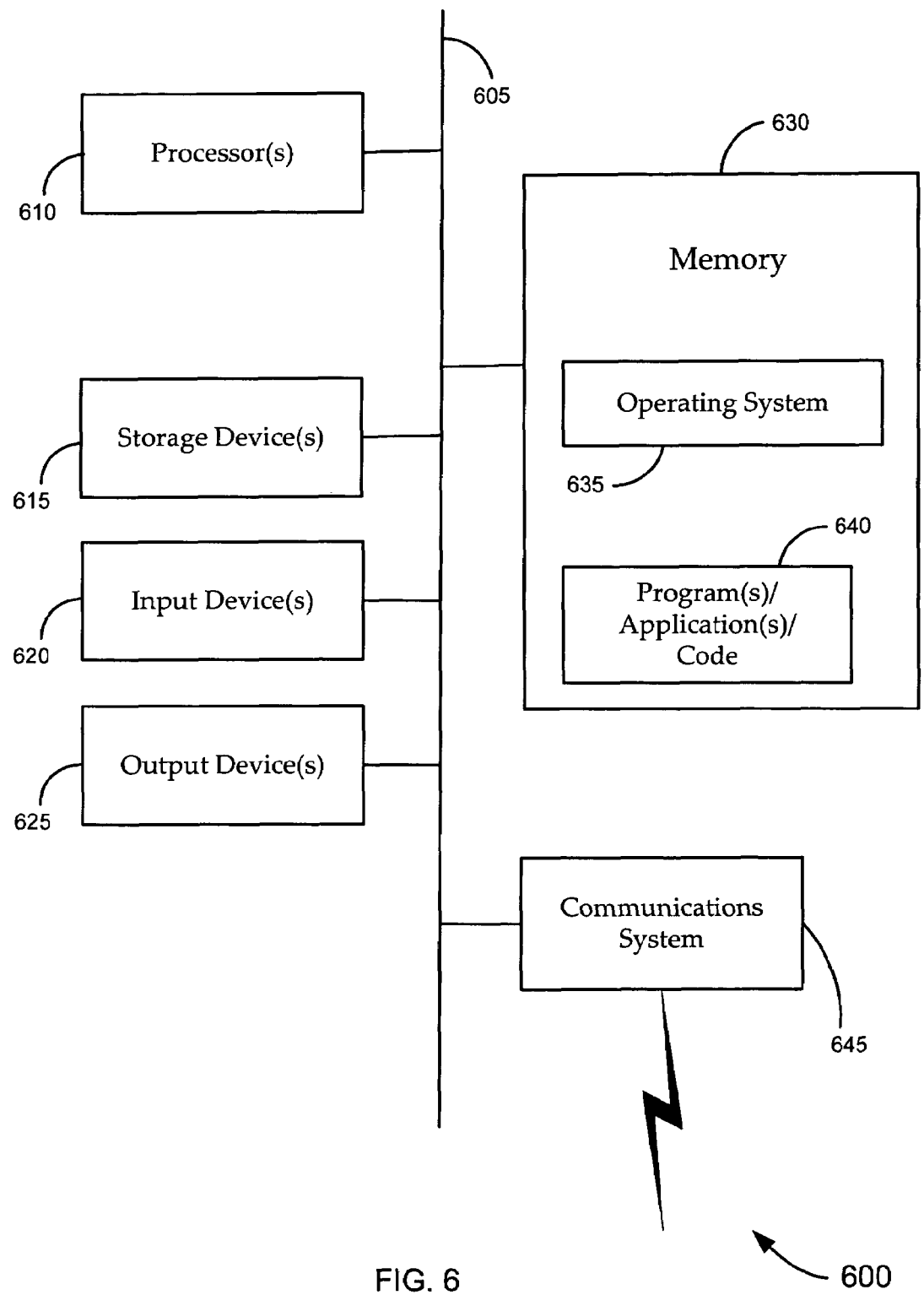
FIG. 6 is a schematic diagram that illustrates a representative device structure that may be used in various embodiments of the present invention.

A device structure 600 that may be used for a computer, server, mobile device, point of sale device, host computer system, check authorization service gateway, or other computing device described herein is illustrated with the schematic diagram of FIG. 6. This drawing broadly illustrates how individual system elements of each of the aforementioned devices may be implemented, whether in a separated or more integrated manner. The exemplary structure is shown comprised of hardware elements that are electrically coupled via bus 605, including processor(s) 610 (which may further comprise a DSP or special-purpose processor), storage device(s) 615, input device(s) 620, and output device(s) 625. The storage device(s) 615 may comprise a computer-readable storage media reader connected to any computer-readable storage medium, the combination comprehensively representing remote, local, fixed, or removable storage devices or storage media for temporarily or more permanently containing computer-readable information. The communications system 645 may comprise a wired, wireless, or other type of interfacing connection that permits data to be exchanged with other devices. The communications system(s) 645 may permit data to be exchanged with a network (including, without limitation, the Network 175).

The structure 600 may also comprise additional software elements, shown as being currently located within working memory 630, including an operating system 635 and other code 640, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

VI. Conclusion

It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

It should be noted that the methods, systems and devices discussed above are intended merely to be exemplary in nature. Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. Also, it is worth noting that technology evolves, and that terms should be interpreted accordingly.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage device" may represent one or more devices for storing data, including read only memory (ROM), random access memory (RAM), magnetic RAM, core memory, magnetic disk storage mediums, optical storage mediums, flash memory devices or other machine readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A system for authorizing, with a host computer system, a transaction using a negotiable instrument, the system comprising:
   a point-of-sale device, wherein the point-of-sale device is configured to:
      read the negotiable instrument provided as payment for the transaction by a user to capture identification information which identifies the negotiable instrument;
      transmit a first communications signal comprising a request to authorize a transaction using the negotiable instrument, wherein the request includes information indicating a user-specified first amount of funds on the negotiable instrument and the identification information; and
      receive a response to the request;
   a database configured to:
      store identification information for each of a plurality of negotiable instruments; and
      store a host-specified amount of funds associated with the stored identification information for each of the plurality of negotiable instruments; and
   a host computer system, in communication with the point-of-sale device and the database, configured to:
      identify a host-specified second amount of funds allocated to the negotiable instrument, the identified amount for storage in the database with the identification information for the negotiable instrument;
      receive the first communications signal;
      authorize the transaction when the database indicates that the host-specified second amount of funds associated with the identification information which identifies the negotiable instrument is equal to the user-specified amount of funds in the request; and
      transmitting a second communications signal, comprising the response to the request and indicating that the transaction has been authorized.

2. The system of claim 1, wherein,
   a request to allocate the second amount of funds to the negotiable instrument is communicated through a web interface by the user of the negotiable instrument.

3. The system of claim 1, wherein the host computer system is further configured to:
   receive a request to allocate the second amount of funds;
   verify the availability of the second amount of funds; and
   allocate the second amount of funds to the negotiable instrument.

4. The system of claim 3, wherein the availability of the second amount of funds is based on the availability of funds in an account or accounts selected from the group consisting of: a stored-value account, a stored-value account funded by payroll funds owed from an employer to an employee, a stored-value card account, a credit card account, a bank account, a savings account, and any combination thereof.

5. The system of claim 1, wherein,
   a request to allocate the second amount of funds to the negotiable instrument is communicated by the user through a telephone voice response unit employing interactive voice response technology; and
   the host computer system stores information in the database indicating an allocation of the second amount of funds to the negotiable instrument.

6. The system of claim 1, wherein the host computer system comprises the database.

7. The system of claim 1, further comprising a check authorization service gateway, in communication with the point-of-sale device and the host computer system, wherein the information comprising the first communications signal and the information comprising the second communications signal are routed through the check authorization service gateway.

8. The system of claim 7, wherein,
   the identification information comprises a routing number, a check number, and an account number which is printed on the negotiable instrument with magnetic ink character recognition ("MICR") technology;
   the check authorization service gateway, upon receiving the first communications signal, recognizes the routing number, and routes the identification information and the second amount of funds to the host computer system;
   the check authorization service gateway, upon receiving the second communications signal, maps the response onto existing responses of the check authorization service, and routes the mapped response to the point-of-sale device.

9. The system of claim 1, wherein the user-specified first amount of funds on the negotiable instrument is entered on the negotiable instrument by the user.

10. The system of claim 9, wherein in the user enters the user specified first amount of funds by:
    writing the first amount on the negotiable instrument;
    entering the first amount into a user interface on a computing device; or
    entering the first amount into a user interface on a computing device and printing the negotiable instrument.

11. The system of claim 1, wherein the user-specified first amount of funds on the negotiable instrument is a preprinted negotiable instrument provided by the user.

12. A system for authorizing a transaction using a negotiable instrument of a plurality of negotiable instruments, the system comprising:
    a host computer system, in communication with a point-of-sale device and a database, configured to:
       receive a request to allocate a first amount of funds to the negotiable instrument;
       allocate the first amount of funds to the negotiable instrument upon verifying the availability of the first amount of funds, wherein upon allocation the first amount of funds comprise a host-specified first amount of funds;

receive from the point-of-sale device a request to authorize a transaction using the negotiable instrument, the request including information indicating a user-specified second amount of funds associated with the negotiable instrument and identification information which identifies the negotiable instrument;

authorize the request for the transaction based at least in part on a query of the database indicating the host-specified first amount of funds associated with the negotiable instrument is equal to the user-specified second amount of funds specified in the request to authorize; and generate a response to the request to authorize indicating that the transaction has been authorized;

the database configured to:
store identification information for each of the plurality of negotiable instruments; and
store a host-specified amount of funds associated with the stored identification information for each of the plurality of negotiable instruments; and the point-of-sale device configured to transmit the request to authorize the transaction using the negotiable instrument, wherein the request includes information indicating the user-specified second amount of funds allocated to the negotiable instrument and identification information which identifies the negotiable instrument.

13. The system of claim 12, wherein the availability of the first amount of funds is based on availability of funds in a stored-value account.

14. The system of claim 13, wherein the stored-value account is funded by payroll funds owed by an employer to an employee.

15. The system of claim 12, wherein the availability of the first amount of funds is based on availability of funds on credit from a credit card account.

16. The system of claim 12, wherein the request to allocate the first amount of funds to the negotiable instrument is communicated through a telephone voice response unit employing interactive voice response technology.

17. The system of claim 12, wherein the request to allocate the first amount of funds to the negotiable instrument is communicated through a web interface by user of the negotiable instrument.

18. The system of claim 12, wherein the host computer system transmits at least part of the identification information to the user upon allocating the first amount of funds.

19. The system of claim 12, wherein,
the host computer system is further configured to generate a transaction number comprising at least part of the identification information upon allocating the first amount of funds;
a telephone operator provides the transaction number to the user; and
the user enters the transaction number on the negotiable instrument.

20. The system of claim 12, wherein the host computer system is further configured to:
generate a transaction number comprising at least part of the identification information upon allocating the first amount of funds; and
authorize the request for the transaction based at least in part on a query of the database indicating that the identification information specified in the request to authorize includes the generated transaction number.

21. The system of claim 12, wherein the identification information comprises a routing number, a check number, and an account number.

22. The system of claim 21, wherein,
the identification information is printed on the negotiable instrument with magnetic ink character recognition ("MICR") technology; and
the point-of-sale device includes a MICR reader which automatically reads the identification information from the negotiable instrument.

23. The system of claim 22, wherein,
the identification information and the user-specified second amount of funds are routed from the point-of-sale device to a check authorization service gateway; and
the check authorization service gateway routes the identification information and the user-specified second amount of funds to the host computer system.

24. The system of claim 12, where
the point-of-sale device authorizes the transaction while omitting any requirement for a user of the negotiable instrument at the point-of-sale device to provide personal identification; and
the host computer system authorization further comprises a warranty for the negotiable instrument.

25. The system of claim 12, wherein the host computer system authorization comprises failing to deny the request to authorize.

26. The system of claim 12, wherein the host computer system comprises the database.

27. A system for authorizing a transaction using a negotiable instrument, the system comprising:
a point-of-sale device, wherein the point-of-sale device is configured to:
read the negotiable instrument provided as payment for the transaction by a user to capture identification information which identifies the negotiable instrument;
transmit a first communications signal comprising a request to authorize a transaction using the negotiable instrument, wherein the request includes information indicating a user-specified first amount of funds on the negotiable instrument and the identification information; and
receive a response to the request;
a database configured to:
store identification information for each of a plurality of negotiable instruments; and
store a host-specified amount of funds associated with the stored identification information for each of the plurality of negotiable instruments; and
a host computer system, in communication with the point-of-sale device and the database, configured to:
receive a request to allocate a second amount of funds to the negotiable instrument;
verify the availability of the second amount of funds from an account;
allocate the second amount of funds to the negotiable instrument thereby rendering the specific amount of funds unavailable for other use from the account, wherein upon allocation the second amount of funds comprise a host-specified second amount of funds;
receive the first communications signal;
authorize the transaction when a query of the database indicates that the host-specified first amount of funds associated with the identification information for the negotiable instrument is equal to the user-specified first amount of funds specified in the request; and
transmit a second communications signal, comprising the response to the request and indicating that the transaction has been authorized.

* * * * *